E. H. MARTIN.
TELEPHONE METER.
APPLICATION FILED FEB. 25, 1911.
1,018,435.
Patented Feb. 27, 1912.
2 SHEETS—SHEET 2.
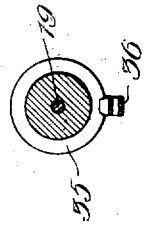
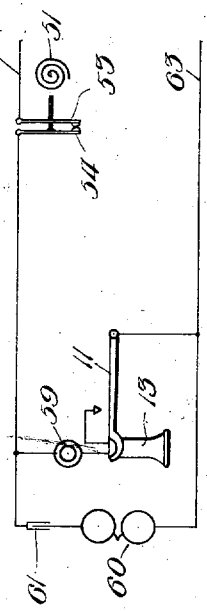
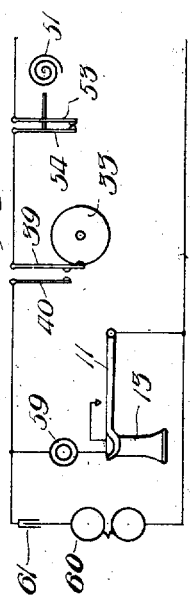
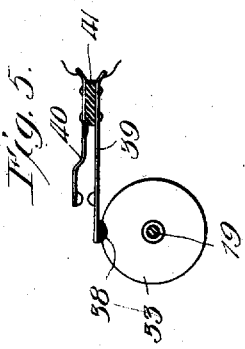
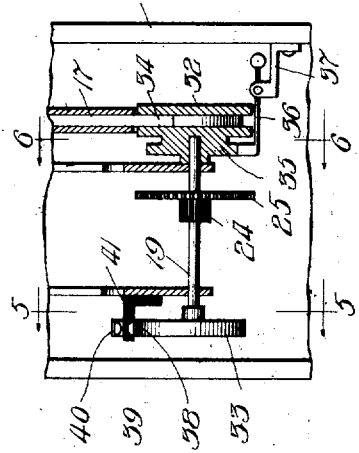
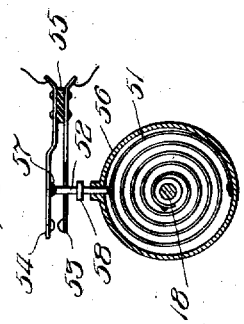
WITNESSES
Harry S. Gaither
H. A. Erust
INVENTOR
Edward H. Martin
by Thomas H. Ferguson
Att'y

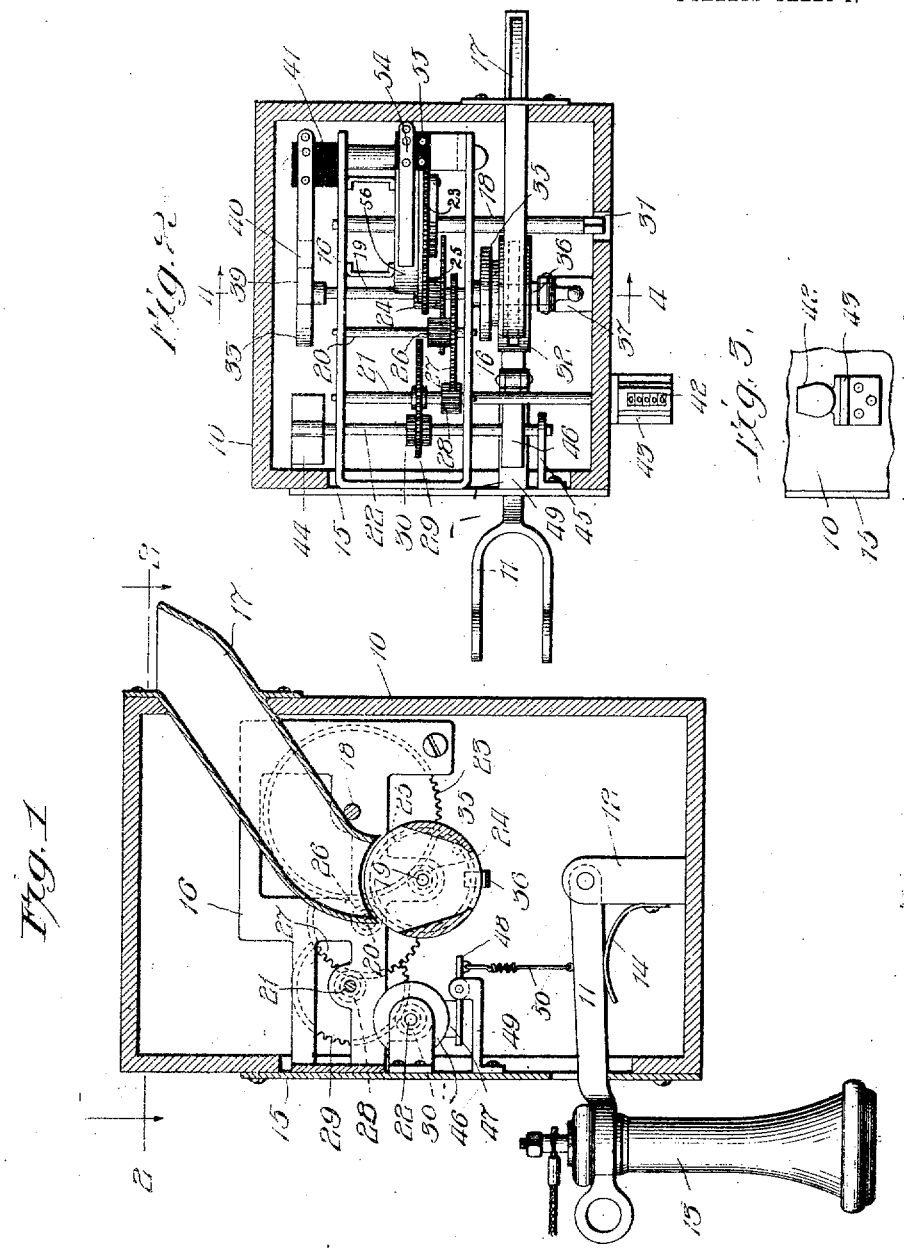

UNITED STATES PATENT OFFICE.

EDWARD H. MARTIN, OF WEBSTER CITY, IOWA.

TELEPHONE-METER.

1,018,435.        Specification of Letters Patent.        Patented Feb. 27, 1912.

Application filed February 25, 1911. Serial No. 610,803.

*To all whom it may concern:*

Be it known that I, EDWARD H. MARTIN, a citizen of the United States, residing at Webster City, in the county of Hamilton and State of Iowa, have invented certain new and useful Improvements in Telephone-Meters, of which the following is a specification.

The present invention relates to telephone systems, and particularly to means for metering the service given to subscribers of such systems.

The object of the invention is to provide a novel system which will measure the actual time the receiver is in service, and which will prevent the use of the telephone when the meter is out of service.

In carrying out my invention, I employ a clock train, a meter to be actuated thereby, and contacts in the talking circuit of the associated transmitter and receiver, and arrange them so that in operation the meter is in motion all the time the talking circuit is closed, the talking circuit being opened as soon as the meter stops, and the meter stopping as soon as the talking circuit is interrupted. In this way, an accurate record is kept.

I have illustrated the invention in connection with slot mechanism which will operate to provide a talking circuit for a definite period of time corresponding to the value of the coin, or token, deposited, but the invention is not limited to such use, but is capable of more extended application.

The specific character of the invention will be best understood upon reference to the following detailed description taken in connection with the accompanying drawings, and its scope will be particularly pointed out in the appended claims.

In said drawings, Figure 1 illustrates a wall set constructed in accordance with my invention, the inclosing casing, or box, being shown in section, and the other parts in elevation; Fig. 2 is a plan view of the same, the box being sectioned on a plane indicated by the line 2—2 of Fig. 1; Fig. 3 is a front elevation of the meter, or counting, mechanism, and a portion of the adjacent box; Fig. 4 is a vertical sectional elevation, the plane of section being indicated by the line 4—4 of Fig. 2; Fig. 5 is a detail of certain contact mechanism controlled by the clock train, the parts shown in section being taken on a plane indicated by the line 5—5 of Fig. 4; Fig. 6 is a similar sectional view, the plane of section being taken on the line 6—6 of Fig. 4, illustrating the coin controlled lever and its associated notched wheel, which normally hold the clock train against movement; Fig. 7 is a sectional view illustrating the main driving spring and coöperating contacts which serve to interrupt the talking circuit when the spring is run down; and Figs. 8 and 9 are diagrams of the electrical connections, Fig. 8 illustrating the connections where slot mechanism is not employed, and Fig. 9 the same where such mechanism is employed.

Throughout these figures, like characters refer to like parts.

In the drawing, 10 designates the box or casing of the wall set in and upon which the various parts of the mechanism are preferably mounted. This casing is provided with the usual switch-hook 11, here shown as pivoted at one end to a post 12 and forked at its other end for the reception of the telephone receiver 13. A spring 14 operates to raise the switch-hook whenever the receiver is removed therefrom. The box 10 is provided with a large opening at one side, which is closed by the escutcheon plate 15. This plate 15 carries the frame 16, upon which the several parts of the clock train are mounted. The opposite side of the box 10 is provided with an opening through which the coin chute 17 extends.

The clock train is of the usual construction and, as here shown, consists of a series of shafts or arbors 18, 19, 20, 21, 22, which carry the intermeshing gear-wheels and pinions 23, 24, 25, 26, 27, 28, 29, 30. These shafts are suitably journaled in the frame 16 and the gear train is such as to drive the last of the series of shafts at a high rate of speed. The shaft 18 extends forward of the frame 16 into an opening 31 in the box 10, where it is squared for the reception of a winding key. The shaft 19 is also extended forward of, and to the rear of, the frame 16. At its forward end, it carries the coin wheel 32, and at its rear end the contact controlled wheel 33. The coin controlled wheel is provided with a slot 34 and an extension 35. The slot is shaped so as to receive a coin, or token, of a given size and to hold it until the wheel has made a turn of several degrees from its normal position. When such point is reached, the coin drops out of the wheel into the interior of the box 10, or other suitable receptacle. When the coin first drops into the wheel, it depresses a weighted lever 36, pivoted at an intermediate point to the bracket 37, secured to the interior of the box 10, which normally engages a notch in the projection 35 of the coin wheel. Due to the presence of a single notch in this projection, the coin wheel is free to complete a rotation before the lever 36 again engages a notch. In this way, the clock train is free to rotate a definite amount, commensurate with the value of the coin, or token, deposited.

The contact controlled wheel 33 upon the rear of the shaft 19 is also provided with a notch which normally engages an insulating projection 38 on a contact spring 39, which normally is out of engagement with the contact spring 40. Whenever the shaft 19 is started in its rotation, the springs 39 and 40 are brought into engagement to complete a circuit through the telephone for a purpose which will hereinafter more fully appear. The springs 39 and 40 are mounted upon a suitable insulating member 41, which is secured to the rear of the frame 16. The shaft 21 also extends forward of the frame 16 through an opening in the front of the box 10 where it forms part of the meter, or counting, mechanism 42 incased in the bracket 43, secured to the front of the box. The shaft 22 is provided at its rear with the usual fan governor 44, and at its forward end is journaled in a bracket 45, secured to the escutcheon plate 15. At its forward end, the shaft 22 is also provided with a brake-wheel 46 against the under side of which bears a brake-shoe 47, carried upon one end of a lever 48, which is pivoted at an intermediate point to a bracket 49, also carried by the escutcheon plate 15. The lever 48 is connected with the switch-hook 11 by some suitable connection such as the wire 50. This wire, as shown, is coiled into a spring throughout a portion of its length to provide for inequalities of adjustment. The main driving spring 51 also coöperates, through the agency of a plunger 52, with contact springs 53, 54, which also serve in the control of the telephone circuit. These springs are mounted upon a suitable insulating member 55, carried by the frame 16. The plunger 52 is slidably mounted in an opening in the casing 56 and engages the under side of the contact spring 54, of course being suitably insulated from it, as by the insulating tip 57. The lower spring 53 is also provided with an enlarged opening through which the plunger 52 passes so as not to make electrical contact with it. The collar 58 on the plunger limits its downward movement. When the spring is wound up, it occupies a relatively small space about the shaft 18 and, as a consequence, the spring 57, due to its inherent tension, engages spring 53 and, as a result, plunger 52 moves downward into the casing 56. The circuit through the springs 53, 54, is maintained until the spring 51 becomes sufficiently unwound to engage the inner end of the plunger 52 and separate the springs 53, 54.

In Figs. 8 and 9, the electrical circuits controlled by this mechanism are diagrammatically shown. In these diagrams, the switch-hook 11 and receiver 13 of the other figures are illustrated. In addition, the substation transmitter 59, the call bell 60, and the condenser 61, of the usual substation telephone circuit, are shown. The telephone line is illustrated by the limbs 62, 63. The call bell and condenser are in normally closed bridge of these limbs, while the transmitter and receiver are in a normally open bridge, controlled by the switch-hook. During conversation, the talking circuit extends from one line limb, through the transmitter and receiver, to the other line limb. This talking circuit is controlled by the contacts 53, 54, associated with the driving spring of the mechanism, as before explained. Fig. 9 differs from Fig. 8 in having the contact springs 39 and 40, controlled by the wheel 33, also included in this talking circuit. It is only when the slot mechanism is employed, that this latter pair of spring contacts is necessary. When the slot mechanism is to be omitted, then these springs 39 and 40, and also the weighted lever 36, are to be omitted. The diagrams merely illustrate a well known substation circuit, but it will be apparent to those skilled in the art that other substation circuits might equally well be employed, the essential point being that the contacts 53 and 54 in the one case, or the contacts 53, 54, and 39, 40, in the other case, control the talking circuit through the substation, this being preferably done by opening the line limbs, as illustrated.

In operating the mechanism, the spring 51 must be first wound up. Until this is done, no talking circuit can be had, for the reason that the contact springs 53, 54 are open. When the spring 51 is once wound, the gear train is free to operate, except when restrained by the brake-shoe 47, or the coin actuated lever 36. Of course, where coin mechanism is not employed, the gear train is not impeded by the lever 36, because such lever is then omitted from the structure.

In considering the operation of the mechanism, we may consider first the case in which the mechanism is not intended for slot service. In that case, the lever 36 and the springs 40 and 39 would be omitted and the latter short-circuited. If then, with the clock train wound up, the receiver 13 be removed from its hook, the brake-shoe 47 recedes from the brake-wheel 46, and the train is free to move. As it moves, the meter 42 is actuated to indicate the duration of service. This indication may be in any suitable units. In the form of the invention here shown, it is in minutes, the meter being mounted upon the second shaft which makes one complete rotation per minute. As soon as the receiver is restored to its hook, the brake-shoe 47 is again brought into play and the further movement of the clock train, and therefore of the meter, arrested. In this way, an exact record is kept of the time the receiver is off the hook and in service. Whenever the spring 51 of the clock train runs down, the talking circuit is opened at contact springs 53, 54, and further conversation can therefore not be carried on until the spring is again wound up, or partially wound. In such event, the meter will again be actuated during the time the receiver is off its hook.

In case the device is operated with the coin slot mechanism in service, then the simple removal of the receiver, even after winding up the clock train, will not necessarily free the train and it will not necessarily close a talking circuit. With the slot mechanism in service, the talking circuit is controlled not only at contacts 53, 54, and the switch-hook, but also at contacts 39, 40, controlled by the wheel 33 on the shaft which carries the coin wheel. If this latter wheel is in position to receive another coin, then contact springs 39, 40, are separated and the talking circuit is interrupted. Consequently, manipulation of the switch-hook cannot close it. Under these circumstances, the deposit of a coin, or token, rocks lever 36 about its pivot in opposition to the force of gravity acting upon its weighted end, and frees it from the notch in the projection 35 of the coin wheel. As a result of the coin thus deposited and the receiver being kept off the switch-hook, the clock train is free to move to close the talking circuit at contacts 39 and 40 and keep it closed at that point until the coin wheel has made a complete revolution and again brought the notch in the projection 35 in position to be engaged by the lever 36. It is not necessary, however, that the conversation continue from the time the coin wheel is in its normal position until it again reaches its normal position. The receiver may be restored to its hook at any point in the interval, and the clock train, and consequently the meter, will be arrested in its movement. Subsequent removals of the receiver will again close the talking circuit and subsequent conversations may be carried on until the coin wheel again gets around to normal, or, in other words, until the value of the deposited token has been obtained in telephone service. When the coin wheel has again reached its normal position, the deposit of an additional coin will again leave the apparatus in condition for further conversation. If at any time the main spring 51 runs down, the talking circuit will be interrupted, as before explained, at contacts 53, 54. This will occur independently of the position of the coin wheel, and when it does occur, it is only necessary to wind up the spring anew.

In carrying out my invention, it will be apparent that it may be embodied in many different types of telephone sets and systems and that many alterations and modifications may be made in the details herein illustrated. I therefore do not wish to be limited to the specific application of the invention herein disclosed, or to the specific details, but aim to cover, by the terms of the appended claims, all legitimate uses and modifications of the invention.

What I claim as new and desire to secure by Letters Patent of the United States is:—

1. A telephone system comprising a telephone line, a transmitter, a receiver, circuit connections for connecting said transmitter and receiver to said line, time measuring mechanism, a switch-hook for controlling said mechanism, and contacts actuated by said mechanism to vary said circuit connections.

2. A telephone system comprising a telephone line, a transmitter and receiver adapted to be included in talking circuit with said line, time measuring mechanism, a switch-hook operative upon the removal of the receiver to include said transmitter and receiver in talking circuit and to set said timing mechanism into operation, and contacts actuated by said mechanism to interrupt said talking circuit upon the running down of said mechanism.

3. A telephone system comprising a telephone line, a transmitter and receiver adapted to be included in talking circuit with said line, a clock train, a meter upon a shaft of said train, a switch-hook operative upon the removal of the receiver to include said receiver and transmitter in talking circuit and to free said clock train, and contacts for interrupting said talking circuit when said train is run down.

4. A telephone system comprising a telephone line, a transmitter and receiver adapted to be included in talking circuit with said line, time measuring mechanism, a switch-hook and means for jointly controlling said mechanism, and means responsive to the operation of said time measuring mechanism to interrupt said talking circuit upon the expiration of a definite time interval.

5. A telephone system comprising a telephone line, a transmitter, a receiver, circuit connections for connecting said transmitter and receiver to said line, time measuring mechanism, means under the sole control of the user of the receiver for starting said mechanism, and contacts actuated by said mechanism to vary said circuit connections.

6. A telephone system comprising a telephone line, a transmitter and receiver adapted to be included in talking circuit with said line, time measuring mechanism operative independently of the electrical condition of said line, a switch-hook and associated means for jointly controlling said mechanism, and means responsive to the operation of said mechanism for interrupting said talking circuit.

7. A telephone system comprising a telephone line, a transmitter, a receiver, circuit connections for connecting said transmitter and receiver to said line, a switch-hook for controlling said connections, time measuring mechanism operative independently of the electrical condition of said line, means for controlling said mechanism, and contacts actuated by said mechanism to vary said circuit connections.

8. A telephone system comprising a telephone line, a transmitter, a receiver, circuit connections for connecting said transmitter and receiver to said line, time measuring mechanism, means under the sole control of the user of the receiver for starting said mechanism, and a switch-hook and contacts actuated by said mechanism for varying said circuit connections.

9. A telephone system comprising a telephone line, a transmitter and receiver adapted to be included in talking circuit with said line, time measuring mechanism, means under the sole control of the user for including said transmitter and receiver in talking circuit and starting said mechanism, and means under the subsequent control of said mechanism for interrupting said talking circuit.

10. A telephone system comprising a telephone line, a transmitter and receiver adapted to be included in talking circuit with said line, time measuring mechanism, means under the sole control of the user for including said transmitter and receiver in talking circuit and starting said mechanism, and contacts actuated by said mechanism to interrupt said talking circuit upon said mechanism reaching a definite limit in its operation.

In witness whereof, I hereunto subscribe my name this 21 day of Feb., 1911.

EDWARD H. MARTIN.

Witnesses:
 E. F. KING,
 A. H. PYLE.